US005835604A

United States Patent [19]

Lee

[11] Patent Number: 5,835,604

[45] Date of Patent: Nov. 10, 1998

[54] METHOD OF MAPPING DESTINATION ADDRESSES FOR USE IN CALCULATING DIGITAL TOKENS

[75] Inventor: David K. Lee, Monroe, Conn.

[73] Assignee: Pitney Bowes Inc., Stamford, Conn.

[21] Appl. No.: 574,746

[22] Filed: Dec. 19, 1995

[51] Int. Cl.[6] .................................................. H04L 9/00

[52] U.S. Cl. ................................ 380/51; 380/23; 380/25; 380/46; 380/49; 380/55

[58] Field of Search .............................. 331/78; 364/717; 380/20, 23, 25, 46, 49, 50, 55, 51

[56] References Cited

U.S. PATENT DOCUMENTS 4,725,718 2/1988 Sansone et al. .
4,757,537 7/1988 Edelmann et al. .
4,775,246 10/1988 Edelmann et al. .
4,796,196 1/1989 Durst .
4,831,555 5/1989 Sansone et al. .
4,873,645 10/1989 Hunter et al. .
4,962,454 10/1990 Sansone et al. .
4,999,481 3/1991 Baer et al. .
5,280,527 1/1994 Gullman et al. .......................... 380/23
5,341,505 8/1994 Whitehouse .
5,454,038 9/1995 Cordery et al. .......................... 380/23

*Primary Examiner*—Bernarr E. Gregory
*Attorney, Agent, or Firm*—Charles R. Malandra, Jr.; Melvin J. Scolnick

[57] ABSTRACT

A method of creating an open system digital token includes sending predetermined information to a digital token generation process. A set of characters are randomly selected from the predetermined information. A mapping algorithm is applied to the selected characters to facilitate a character recognition process and a random number algorithm is applied to the mapped selected characters to obtain a random number. A digital token is calculated using the random number. The predetermined information may be delivery address information in the form of an ASCII string which is reduced by eliminating certain non-alphanumeric characters from the ASCII string. Certain characters can be modified to facilitate OCR processing. A plurality of characters are randomly selected from the reduced ASCII string to determine random positions in the reduced ASCII string. The ASCII code of the selected characters are mapped to the code of a reduced space using a mapping table. The mapped delivery address information is included in a digital token calculation of the digital token generation process.

8 Claims, 5 Drawing Sheets

METHOD OF MAPPING DESTINATION ADDRESSES FOR USE IN CALCULATING DIGITAL TOKENS

FIELD OF THE INVENTION

The present invention relates to advanced postage payment systems and, more particularly, to advanced postage payment systems having precomputed postage payment information.

RELATED APPLICATIONS

The present application is related to the following U.S. patent applications Ser. Nos. 08/575,106, now U.S. Pat. No. 5,625,694, 08/575,107 08/574,745; 08/575,110; 08/574,743; 08/575,112; 08/575,109; 08/575,104; 08/574,749, now U.S. Pat. No. 5,590,198; and Ser. No. 08/575,111, now abandoned, each filed Dec. 19, 1995 and assigned to the assignee of the present invention.

BACKGROUND OF THE INVENTION

Postage metering systems are being developed which employ digital printers to print encrypted information on a mailpiece. Such metering systems are presently categorized by the USPS as either closed systems or open systems. In a closed system, the system functionality is solely dedicated to metering activity. A closed system metering device includes a dedicated printer securely coupled to a metering or accounting function. In a closed system, since the printer is securely coupled and dedicated to the meter, printing cannot take place without accounting. In an open metering system the system functionality is not dedicated solely to metering activity. An open system metering device includes a printer that is not dedicated to the metering activity, thus freeing system functionality for multiple and diverse uses in addition to the metering activity. An open system metering device is a postage evidencing device (PED) with a non-dedicated printer that is not securely coupled to a secure accounting module.

Typically, the postage value for a mailpiece is encrypted together with other data to generate a digital token which is then used to generate a postage indicia that is printed on the mailpiece. A digital token is encrypted information that authenticates the information imprinted on a mailpiece including postal value. Examples of systems for generating and using digital tokens are described in U.S. Pat. Nos. 4,757,537, 4,831,555, 4,775,246, 4,873,645 and 4,725,718, the entire disclosures of which are hereby incorporated by reference. These systems employ an encryption algorithm to encrypt selected information to generate at least one digital token for each mailpiece. The encryption of the information provides security to prevent altering of the printed information in a manner such that any misuse of the tokens is detectable by appropriate verification procedures.

Typical information which may be encrypted as part of a digital token includes origination postal code, vendor identification, data identifying the PED, piece count, postage amount, date, and, for an open system, destination postal code. These items of information, collectively referred to as Postal Data, when encrypted with a secret key and printed on a mail piece provide a very high level of security which enables the detection of any attempted modification of a postal revenue block or a destination postal code. A postal revenue block is an image printed on a mail piece that includes the digital token used to provide evidence of postage payment. The Postal Data may be printed both in encrypted and unencrypted form in the postal revenue block. Postal Data serves as an input to a Digital Token Transformation which is a cryptographic transformation computation that utilizes a secret key to produce digital tokens. Results of the Digital Token Transformation, i.e., digital tokens, are available only after completion of the Accounting Process.

Digital tokens are utilized in both open and closed metering systems. However, for open metering systems, the non-dedicated printer may be used to print other information in addition to the postal revenue block and may be used in activity other than postage evidencing. In an open system PED, addressee information is included in the Postal Data which is used in the generation of the digital tokens. Such use of the addressee information creates a secure link between the mailpiece and the postal revenue block and allows unambiguous authentication of the mail piece.

Prior open metering system designs use the destination postal code (in U.S.A. this is the 11 digit zip code) to identify the address. This approach has several problems. For international mail, a destination postal code may not exist. If one does exist, a mailer may not have access to it. If the mailer guesses an incorrect postal code, the cost of returning and correcting the mail is very high for the postal service. The destination postal code does not identify the recipient of the mail, so mail can be sent fraudulently to several people in the same building.

SUMMARY OF THE INVENTION

The present invention provides a method of mapping destination addresses for use in a token generation process for an open metering system, such as a PC-based metering system that comprises a PC, a plug-in peripheral as a vault to store postage funds and a non-secure and non-dedicated printer to generate digital tokens and later print evidence of postage on envelopes and labels at the same time it prints a recipient address.

An open metering system must include delivery address information, such as the 11-digit ZIP, in the calculation of digital tokens to protect the system from a fraudulent copying of the tokens. In accordance with the present invention, a PC-based metering system supplies the entire delivery address to the vault. The vault selects a set of characters randomly from the delivery address characters such that it would be difficult to guess outside the vault which characters have been selected. The vault then applies mapping to the selected characters to reduce the amount of data further. The mapping is specially designed to help the character recognition process for the verification system but maintains the integrity of the open metering system.

In accordance with the present invention a method of creating an open system digital token includes sending predetermined information to a digital token generation process. A set of characters are randomly selected from the predetermined information. A mapping algorithm is applied to the selected characters to facilitate a character recognition process and a random number algorithm is applied to the mapped selected characters to obtain a random number. A digital token is calculated using the random number. The predetermined information may be delivery address information in the form of an ASCII string which is reduced by eliminating certain non-alphanumeric characters from the ASCII string. Certain characters can be modified to facilitate OCR processing. A plurality of characters are randomly selected from the reduced ASCII string to determine random positions in the reduced ASCII string. The ASCII code of the selected characters are mapped to the code of a reduced space using a mapping table. The mapped delivery address information is included in a digital token calculation of the digital token generation process.

The method of the present invention provides security that prevents tampering and false evidence of postage payment and provides the ability to do batch processing of digital tokens.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
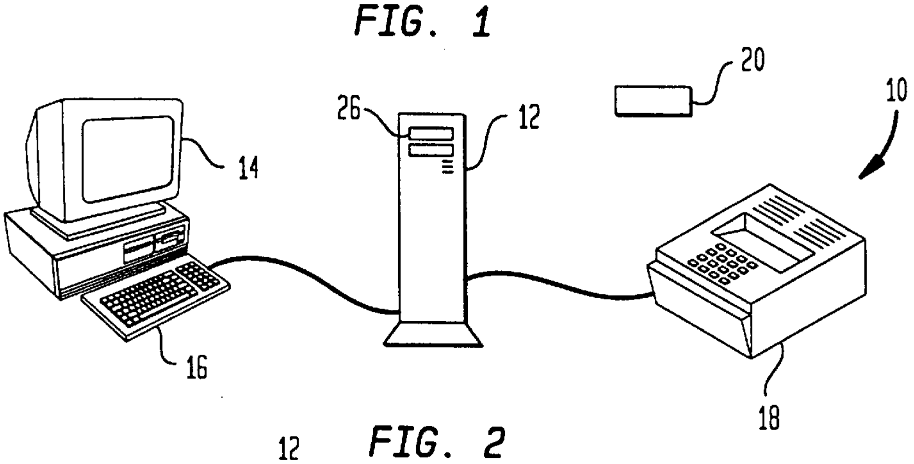
FIG. 1 is a block diagram of a PC-based metering system in which the present invention operates.
Figure 2:
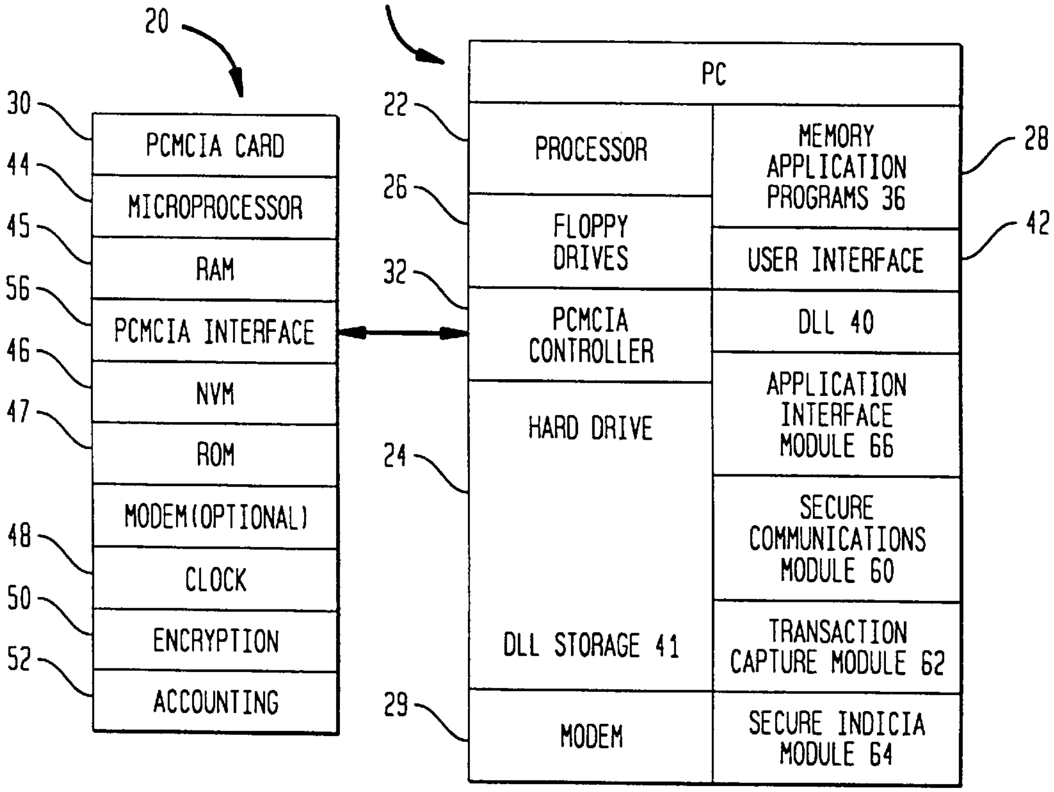
FIG. 2 is a schematic block diagram of the PC-based metering system of FIG. 1 including a removable vault card and a DLL in the PC.
Figure 3:
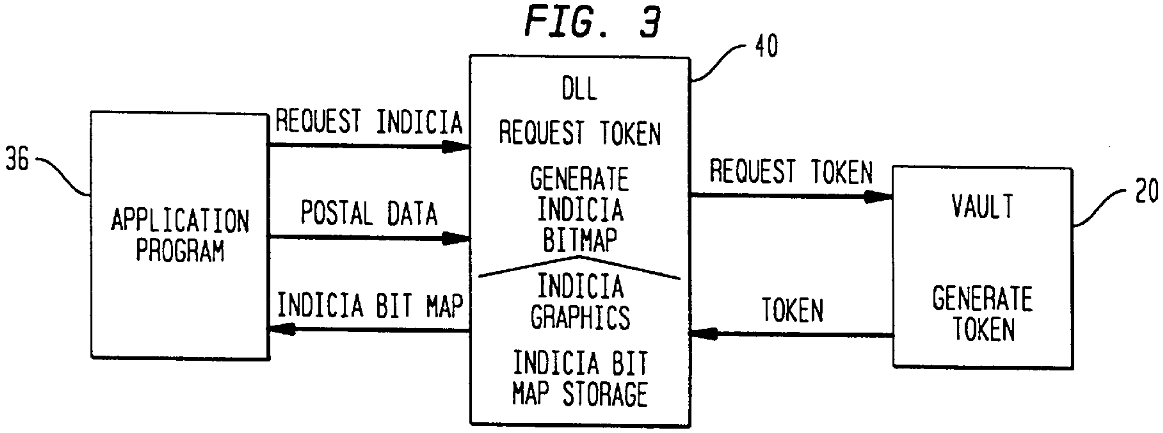
FIG. 3 is a schematic block diagram of the DLL in the PC-based metering system of FIG. 1 including interaction with the vault to issue and store digital tokens.

In describing the present invention, reference is made to the drawings, wherein there is seen in FIGS. 1–3 an open system PC-based postage meter, also referred to herein as a PC meter system, generally referred to as 10, in which the present invention performs the digital token process. PC meter system 10 includes a conventional personal computer configured to operate as a host to a removable metering device or electronic vault, generally referred to as 20, in which postage funds are stored. PC meter system 10 uses the personal computer and its printer to print postage on envelopes at the same time it prints a recipient's address or to print labels for pre-addressed return envelopes. It will be understood that although the preferred embodiment of the present invention is described with regard to a postage metering system, the present invention is applicable to any value metering system that includes a transaction evidencing.

As used herein, the term personal computer is used generically and refers to present and future microprocessing systems with at least one processor operatively coupled to user interface means, such as a display and keyboard, and storage media. The personal computer may be a workstation that is accessible by more than one user.

The PC-based postage meter 10 includes a personal computer (PC) 12, a display 14, a keyboard 16, and an non-secured digital printer 18, preferably a laser or ink-jet printer. PC 12 includes a conventional processor 22, such as the 80486 and Pentium processors manufactured by Intel, and conventional hard drive 24, floppy drive(s) 26, and memory 28. Electronic vault 20, which is housed in a removable card, such as PCMCIA card 30, is a secure encryption device for postage funds management, digital token generation and traditional accounting functions. PC meter system 10 may also include an optional modem 29 which is located preferably in PC 12. Modem 29 may be used for communicating with a Postal Service or a postal authenticating vendor for recharging funds (debit or credit). In an alternate embodiment the modem may be located in PCMCIA card 30.

PC meter system 10 further includes a Windows-based PC software module 34 (FIGS. 3 and 4) that is accessible from conventional Windows-based word processing, database and spreadsheet application programs 36. PC software module 34 includes a vault dynamic link library (DLL) 40, a user interface module 42, and a plurality of sub-modules that control the metering functions. DLL module 40 securely communicates with vault 20 and provides an open interface to Microsoft Windows-based application programs 36 through user interface module 42. DLL module 40 also securely stores an indicia image and a copy of the usage of postal funds of the vault. User interface module 42 provides application programs 36 access to an electronic indicia image from DLL module 40 for printing the postal revenue block on a document, such as an envelope or label. User interface module 42 also provides application programs the capability to initiate remote refills and to perform administrative functions.

PC-based meter system 10 operates as a conventional personal computer with attached printer that becomes a postage meter upon user request. Printer 18 prints all documents normally printed by a personal computer, including printing letters and addressing envelopes, and in accordance with the present invention, prints postage indicia.

The vault is housed in a PCMCIA I/O device, or card, 30 which is accessed through a PCMCIA controller 32 in PC 12. A PCMCIA card is a credit card size peripheral or adapter that conforms to the standard specification of the personal Computer Memory Card International Association. Referring now to FIGS. 2 and 3, the PCMCIA card 30 includes a microprocessor 44, redundant non-volatile memory (NVM) 46, clock 48, an encryption module 50 and an accounting module 52. The vault includes an interface 56 that communicates with the host processor 22 through PCMCIA controller 32. The encryption module 50 may implement the NBS Data Encryption Standard (DES) or another suitable encryption scheme. In the preferred embodiment, encryption module 50 is a software module. It will be understood that encryption module 50 could also be a separator device, such as a separate chip connected to microprocessor 44. Accounting module 52 may be EEPROM that incorporates ascending and descending registers as well as postal data, such as origination ZIP Code, vendor identification, data identifying the PC-based postage meter 10, sequential piece count of the postal revenue block generated by the PC-based postage meter 10, postage amount and the date of submission to the Postal Service. As is known, an ascending register in a metering unit records the amount of postage that has been dispensed, i.e., issued by the vault, in all transactions and the descending register records the value, i.e., amount of postage, remaining in the metering unit, which value decreases as postage is issued.

The functionality of DLL 40 is a key component of PC-base meter 10. DLL 40 includes both executable code and data storage area 41 that is resident in hard drive 24 of PC 12. In a Windows environment, a vast majority of applications programs 36, such as word processing and spreadsheet programs, communicate with one another using one or more dynamic link libraries. PC-base meter 10 encapsulates all the processes involved in metering, and provides an open interface to vault 20 from all Windows-based applications capable of using a dynamic link library. Any application program 36 can communicate with vault microprocessor 44 in PCMCIA card 30 through DLL 40.

DLL 40 includes the following software sub-modules. Secure communications sub-module 80 controls communications between PC 12 and vault 20. Transaction captures sub-module 82 stores transaction records in PC 12. Secure indicia image creation and storage sub-module 84 generates an indicia bitmap image and stores the image for subsequent printing. Application interface sub-module 86 interfaces with non-metering application programs and issues requests for digital tokens in response to requests for indicia by the non-metering application programs. Detailed descriptions of PC meter system 10 and the digital token generation process are provided in related U.S. patent applications Ser. Nos. 08/575,112 and 08/575,107 filed concurrently herewith, each of which is incorporated herein in its entirety by reference.

Since printer 18 is not dedicated to the metering function, issued digital tokens may be requested, calculated and stored in PC 12 for use at a later time when, at a user's discretion, corresponding indicia are generated and printed. Such delayed printing and batch processing is described in more detail in co-pending U.S. patent application Ser. No. [Attorney Docket E-452], which is incorporated herein in its entirety by reference.

Digital Token Generation Process

In accordance with the present invention, when a request for digital token is received from PC 12, vault 20 calculates and issues at least one digital token to PC 12 in response to the request. The issued digital token is stored as part of a transaction record in PC 12 for printing at a later time. In the preferred embodiment of the present invention, the transaction record is stored in a hidden file in DLL storage area 41 on hard drive 24. Each transaction record is indexed in the hidden file according to addressee information. It has been discovered that this method of issuing and storing digital tokens provides an additional benefit that one or more digital tokens can be reissued whenever a token has not been printed or if a problem has occurred preventing a printing of an indicia with the token.

By storing digital tokens as part of transaction records in PC 12 the digital tokens can be accessed at a later time for the generation and printing of indicia which is done in PC 12. Furthermore, if a digital token is lost, i.e., not properly printed on a mailpiece, the digital token can be reissued from DLL 40 rather than from vault 20. The storage of transaction records that include vault status at the end of each transaction provides a backup to the vault with regard to accounting information as well as a record of issued tokens. The number of transaction records stored on hard drive 24 may be limited to a predetermined number, preferably including all transactions since the last refill of vault 20.

Address Mapping

Figure 4A:
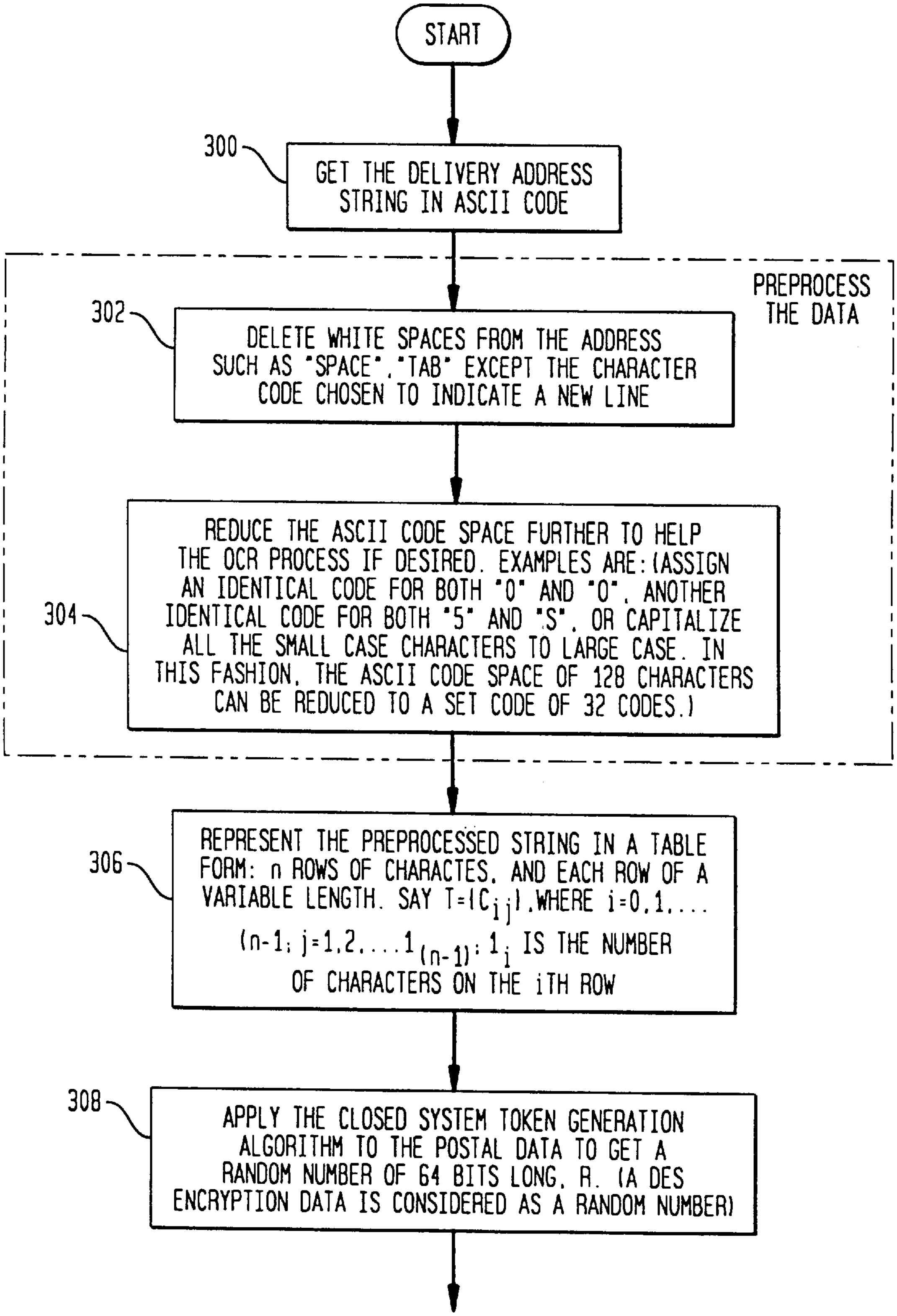
FIG. 4 (4A–4B) is a flow chart of the address mapping for a digital token generation process in accordance with the present invention.
Figure 4B:
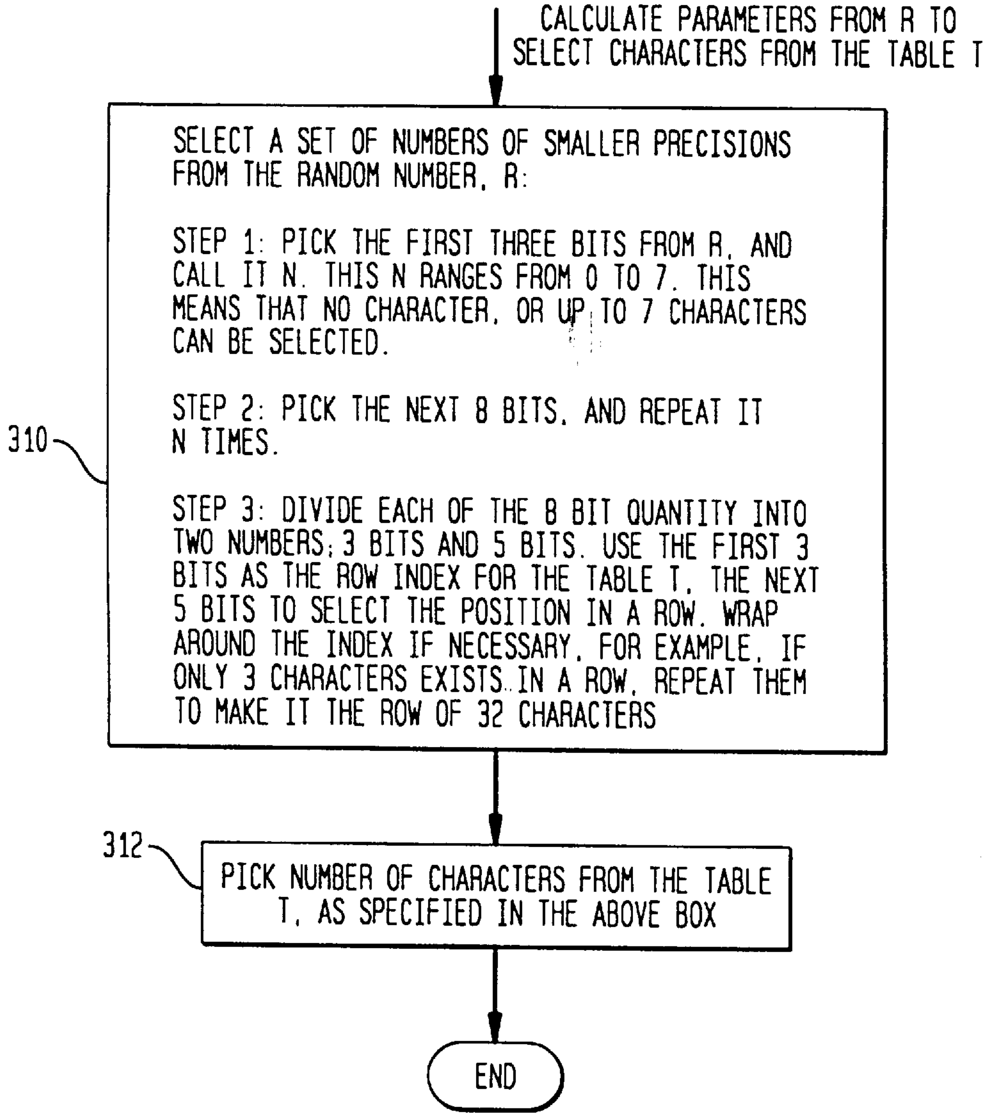

In accordance with the present invention, delivery address information is included in an open metering system token calculation in the following manner. Referring now to FIG. 4, at 300 the entire delivery address is provided to vault 20. The address is supplied in the form of a data string in ASCII code, which includes white spaces, such as the 'space', 'carriage return', 'tab', and 'line feed'. At 302 and 304, the string of ASCII code is preprocessed respectively to remove unnecessary characters from the string and to assign an identical code to certain characters to reduce the chance of misread in the OCR verification process. At 302, all white spaces are deleted from the string of ASCII code except for 'line feed'. At 304, the typical ASCII code space of 128 characters may be further reduced by assigning an identical code to characters that are similar in appearance. For example, 'o', 'O', '0' can be assigned to the code 'o'; '1', 'I','l' to the code 'l'; '5', '8', 'S' to '5'. The purpose of this conversion is to improve the token verification process which involves OCR reading of the printed delivery address. It will be understood that such preprocessing can be optimized to reduce the ASCII code space from 62 (a–z, A–Z, 0–9) to 32 codes or less.

At 306, the resulting preprocessed string of ASCII code is represented in a table T with n rows of characters with each row having a variable length corresponding to the preprocessed delivery address. $T=\{C_{ij}\}$, where i=0,1, . . . (n−1);j=1,2, . . . $1_{(n-1)}$; and $\mathbf{1}_i$ is the number of characters in the ith row. At 308, a random number algorithm is applied to postal data, such as piece count, to obtain a 64 bit random number R. The random number R is used to select a random number of characters randomly from the preprocessed ASCII string. To determine the random positions of the address string, one can encrypt the piece count using one of the stored encryption keys in the vault. For example, a single DES encryption produces a 64 bit 'random' number that is divided into groups of bits to select characters for token generation process.

Figure 5:
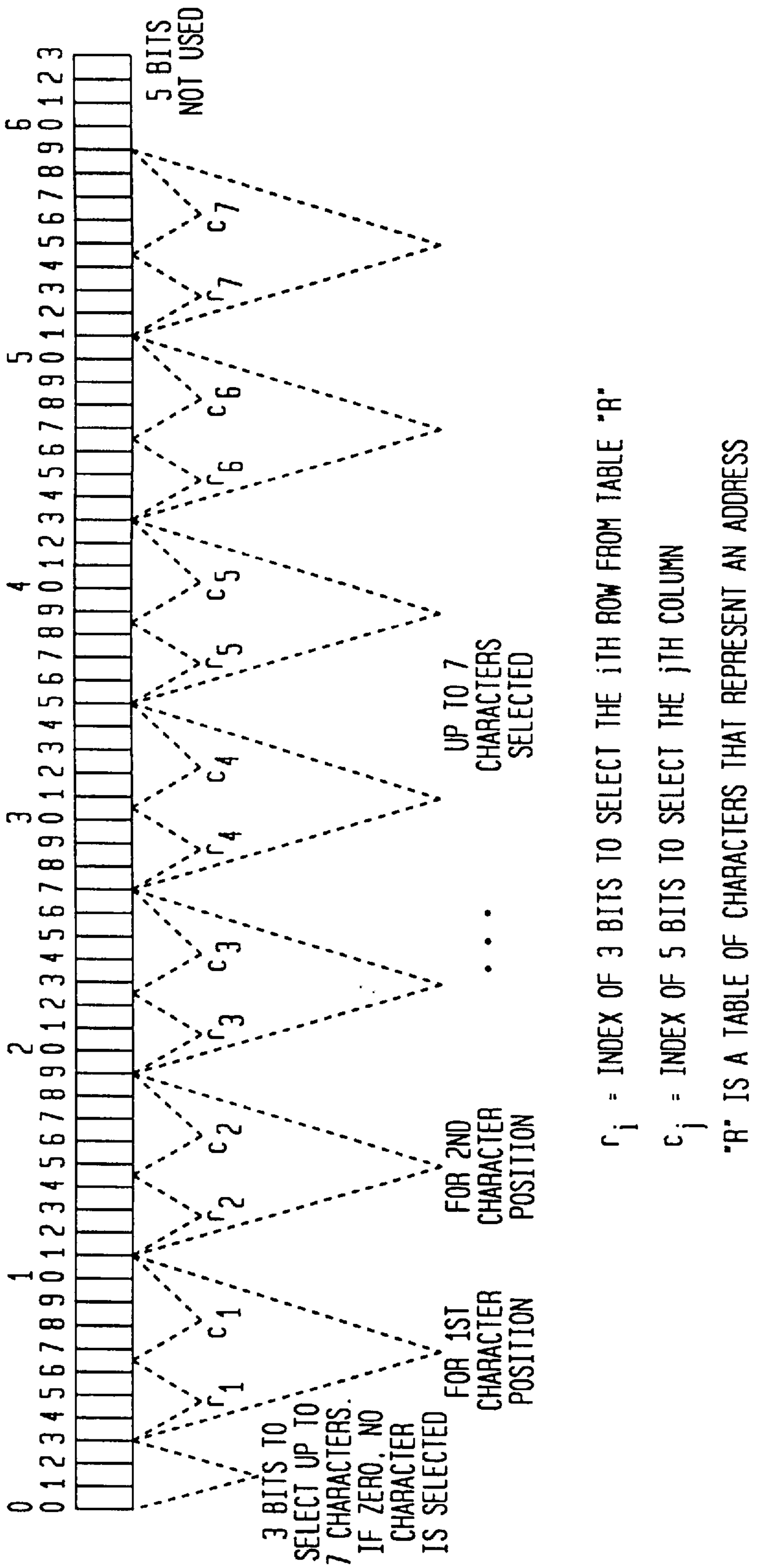
FIG. 5 is a representation the assignment of bits of a random number to select a random number of characters from an address string used in the address mapping of FIG. 4.
Figure 6:
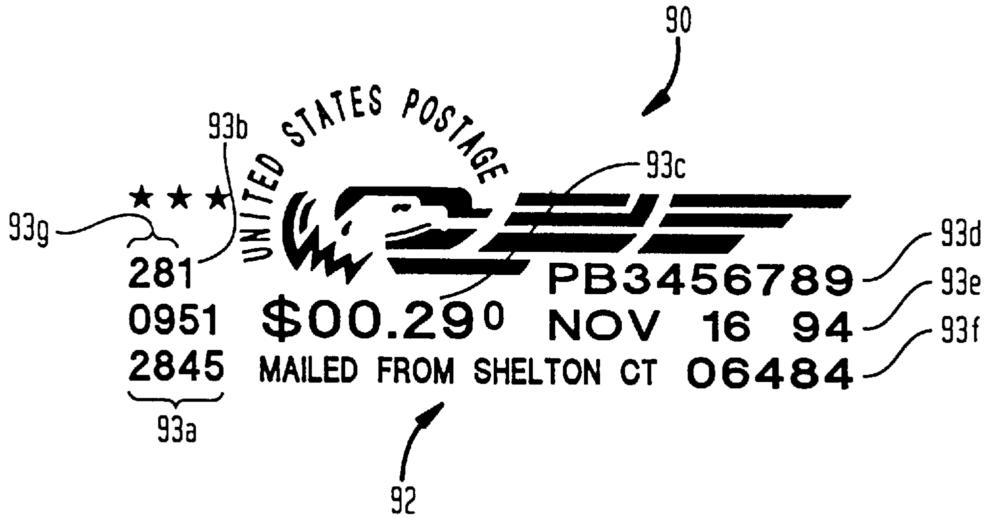
FIG. 6 is an representation of indicia generated and printed by the PC-based metering system of FIG. 1.

At 310, parameters are calculated from R that are used to select characters from table T. In accordance with the preferred embodiment of the present invention, a set of numbers of smaller precision are selected from R, for example based on the length of the rows. Referring now to FIG. 5, R is divided into two groups. The first group consists of the first three bits that are use to determine the number of characters N to be selected. Since N has a range from 0–7, this means that no character or up to 7 characters can be selected. The remaining bits of R are further divided into consecutive sub-groups of 8 bits. The first N sub-groups are used to identify the characters to be selected for use in the digital token calculation. For each of the N sub-groups, the first three bits represent a row index for table T, and the last five bits represent the character's position in the row. When the number of rows or the number of characters in a row is less than the respective index determined in this manner, the rows or characters in the rows are repeated as necessary to obtain a character for selection. For example, if table T has only 4 rows and the first three digits of a sub-group total 6, then the first two rows are repeated so that a sixth row is available for character selection. Likewise, if only 3 characters exist in a row of table T, the characters are repeated six times when the last five digits of the sub-group total 21.

Referring again to FIG. 4, at 312 the delivery address characters that are picked according to step 310 are provided for the calculation of the digital token.

The present invention provides several benefits for the open system digital token generation process. The amount of data for character recognition is minimized which significantly reduces any chance of for misrecognitions during the verification process. The random selection of characters from the delivery address makes it virtually impossible for anyone to guess the number of characters used or which characters are used in the digital token generation process.

It will be understood that the present invention is not limited to the mapping of addressee information or to an open postage metering system. The present invention applies to any transaction evidencing system in which a block of information is used to authenticate a document and the information is later scanned from the document in the verification process.

The present invention is suitable for generating a batch of tokens for addressees in a mailing list rather than entering such list of addressees one at a time. The batch of tokens are part of a batch of transaction records, that are indexed in the transaction file in the DLL storage area 41, which are later used to generate indicia images when printing envelopes for the mailing list. Such batch processing would be useful, for example, to production mailers which often have databases of addresses from which to generate mail. These databases are usually pre-processed and sorted to take advantage of postal discounts and recipient profiles for direct marketing opportunities. The address mapping for each of the addressees would function as described above.

In an alternate embodiment, a PC-based open metering system is part of a network with the vault connected to a server PC and the user requesting postage from a user PC. The token generation process would proceed as previously described except that the vault functions, including token generation, would occur in the server PC or the vault card connected thereto. The server PC also stores a record of all transactions for backup and disaster recovery purposes. The user PC would store the transaction records, including issued tokens, on its hard drive and would generate indicia corresponding thereto. This configuration would allow multiple users to send a letter to the same addressee without the token generation being inhibited. A more detailed description of a network based PC meter system is disclosed in co-pending U.S. patent application Ser. No. [Attorney Docket E-444], which is incorporated herein in its entirety by reference.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A method of generating a digital token in a metering system from predetermined information that is to be imprinted on a mailpiece being processed by the metering system, comprising the steps of:

sending the predetermined information to a digital token generator;

organizing the predetermined information in a table format;

applying a random number algorithm to the predetermined information to obtain a random number;

selecting parameters from the random number to select characters from the predetermined information in table format;

selecting a set of characters of the predetermined information in accordance with the selected parameters; and calculating a digital token using the random number.

2. The method of claim 1 wherein the step of selecting parameters from the random number comprises the steps of:

using the first three bits of the random number to determine the number of characters to be selected from the predetermined information;

dividing the remaining bits of the random number into at least 8 groups of consecutive bits; and subdividing each of the groups of bits into two subgroups, the first subgroup indicating the row of a selected character and the second subgroup indicating the column of the selected character.

3. The method of claim 2 wherein the step of selecting a set of characters comprises the step of:

repeating a row or column of characters of the predetermined information in table format as necessary whenever a value of one of the first or second subgroups is greater than the number of rows and columns of the predetermined information in table format.

4. The method of claim 1 comprising the further step of: printing at least part of the calculated digital token on the mailpiece.

5. A method of generating a digital token for a mailpiece being processed in an open metering system, comprising the steps of:

providing destination address information for a mailpiece in the form of an ASCII string;

reducing the ASCII string by eliminating certain non-alphanumeric characters, such as "space" and "tab";

modifying certain characters in the reduced ASCII string to facilitate OCR processing;

selecting a plurality of characters randomly from the reduced ASCII string to determine random positions in the reduced ASCII string;

mapping the ASCII code of the selected characters to the code of a reduced space using a mapping table; and including the mapped destination address information in a digital token calculation of the digital token generation process.

6. The method of claim 5 wherein the step of selecting a plurality of characters randomly comprises the further step of:

applying a random number algorithm to the destination address information to obtain a random number;

using the first three bits of the random number to determine the number of characters to be selected from the predetermined information;

dividing the remaining bits of the random number into at least 8 groups of consecutive bits; and subdividing each of the groups of bits into two subgroups, the first subgroup indicating the row of a selected character and the second subgroup indicating the column of the selected character.

7. The method of claim 6 wherein the step of selecting a plurality of characters randomly comprises the further step of:

repeating a row or column of characters of the predetermined information in table format as necessary whenever a value of one of the first or second subgroups is greater than the number of rows and columns of the predetermined information in table format.

8. The method of claim 5 comprising the further step of: printing at least part of the calculated digital token on the mailpiece.

* * * * *